E. F. N. CANDIA.
AUTOMATIC ADVERTISING APPARATUS.
APPLICATION FILED SEPT. 7, 1909.
1,082,583.
Patented Dec. 30, 1913.
5 SHEETS—SHEET 5.
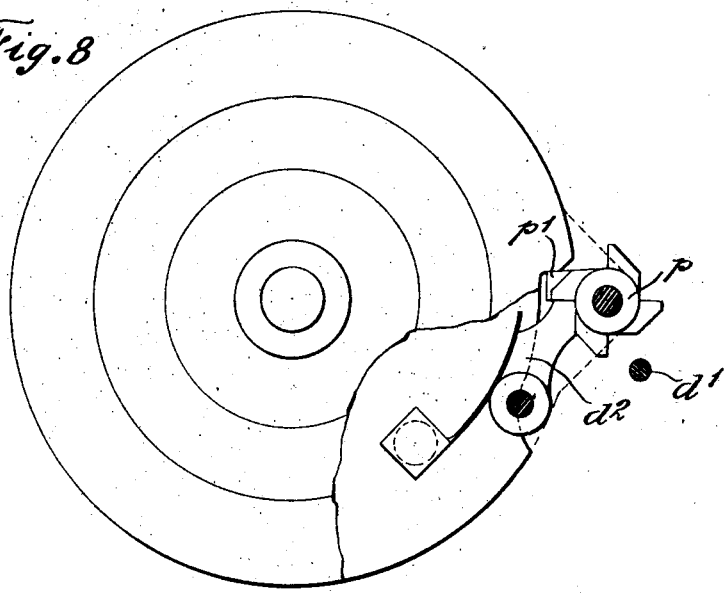
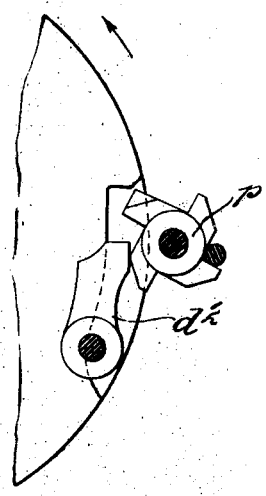
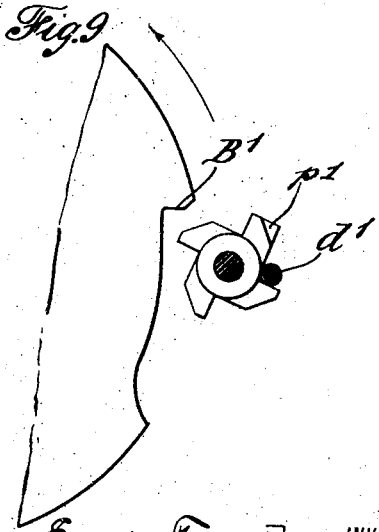
WITNESSES:
INVENTOR
Edward Francis Nicholas Candia
BY
ATTORNEY

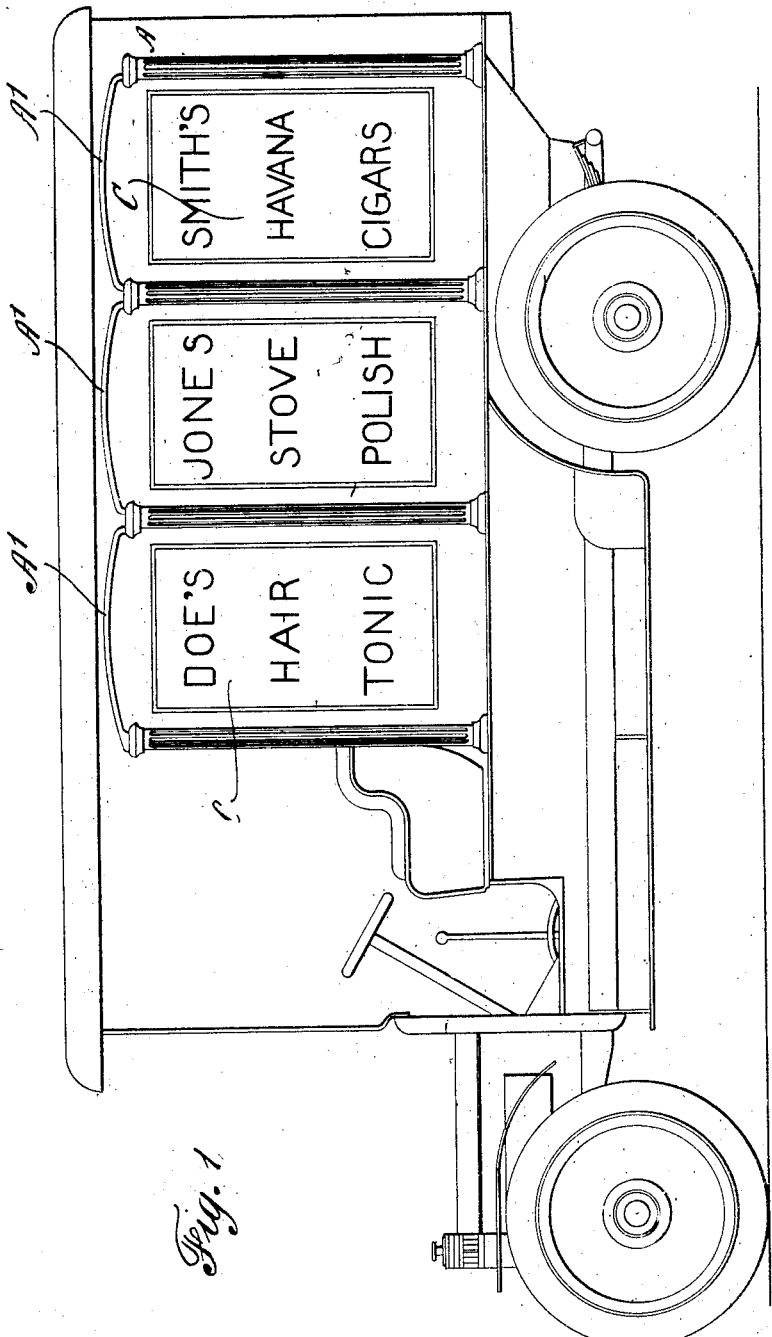

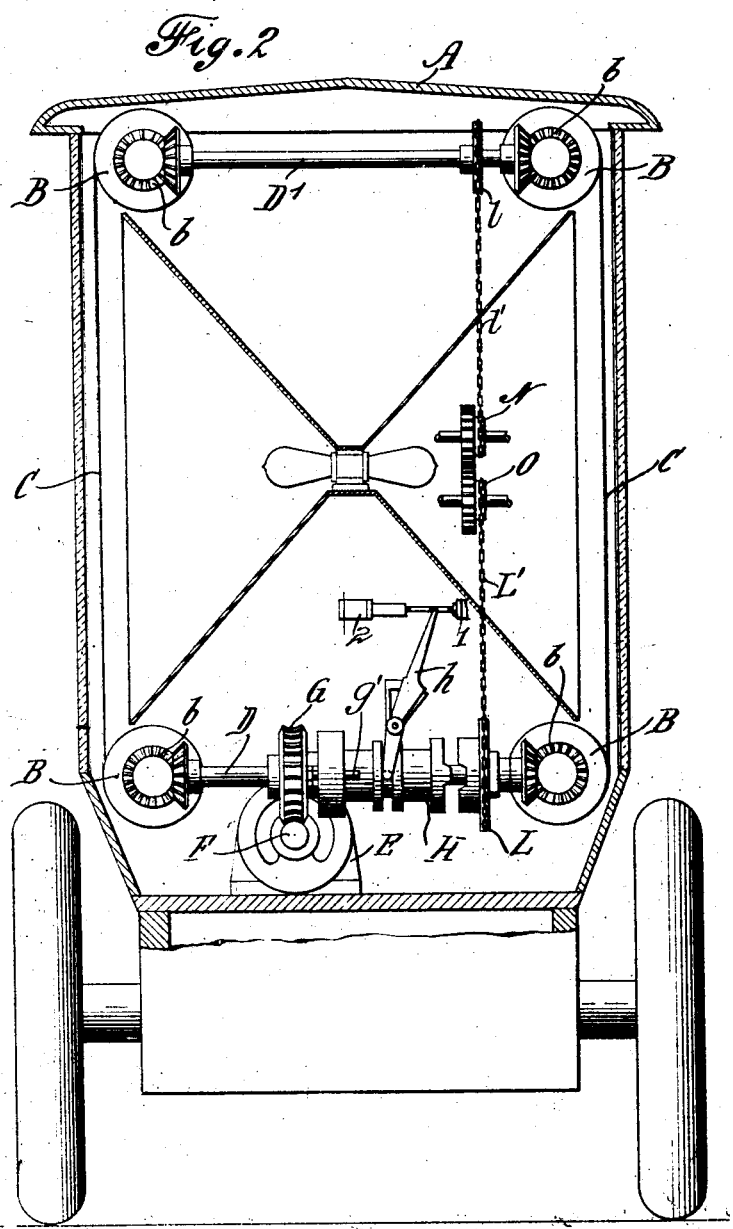

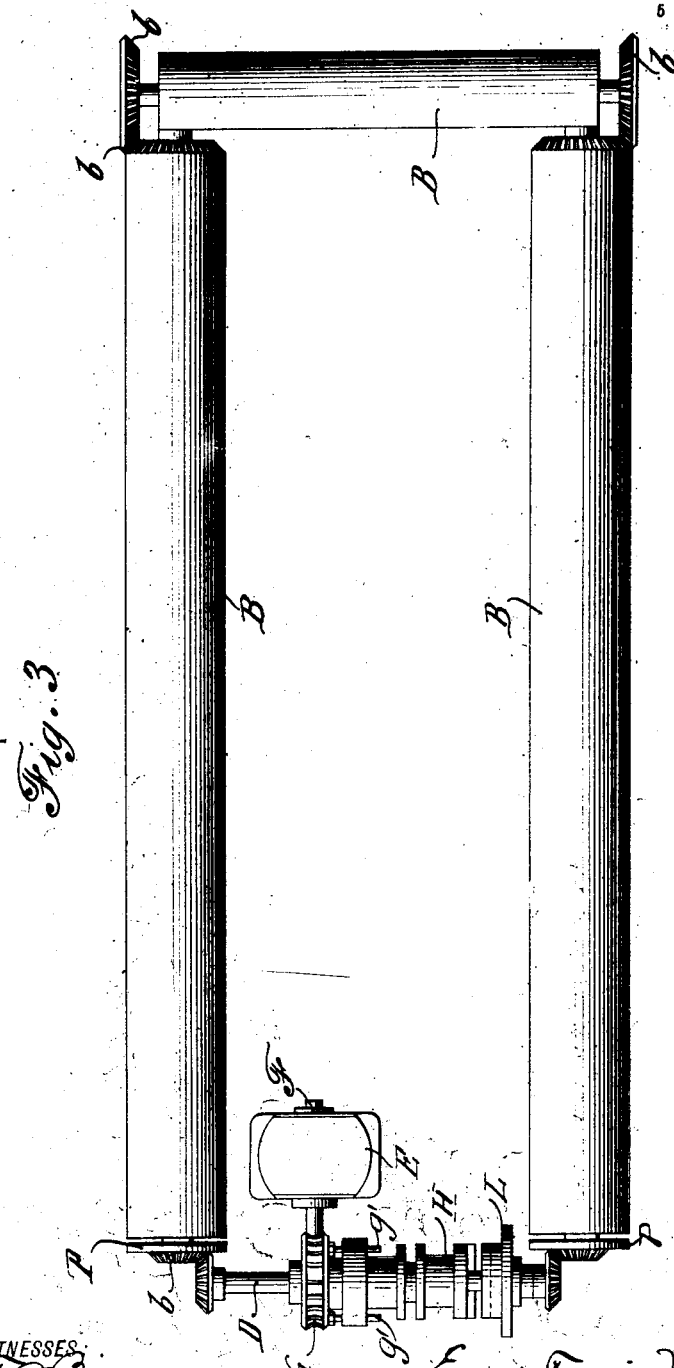

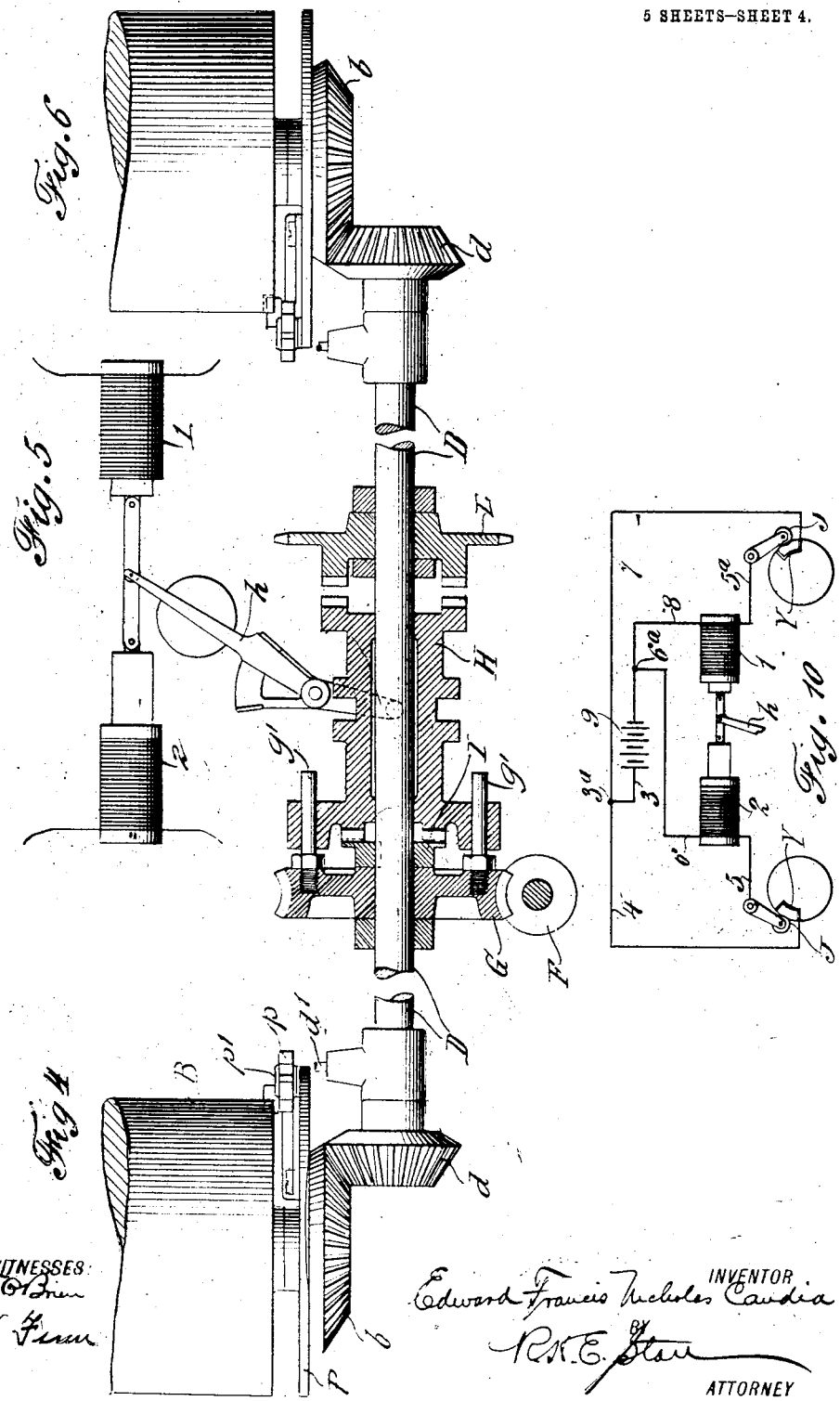

UNITED STATES PATENT OFFICE.

EDWARD FRANCIS NICHOLAS CANDIA, OF NEW YORK, N. Y.

AUTOMATIC ADVERTISING APPARATUS.

1,082,583.  Specification of Letters Patent.  Patented Dec. 30, 1913.

Application filed September 7, 1909. Serial No. 516,558.

*To all whom it may concern:*

Be it known that I, EDWARD FRANCIS NICHOLAS CANDIA, a subject of the King of Italy, and a resident of the borough of Manhattan, city, county, and State of New York, have invented certain new and useful Improvements in Automatic Advertising Apparatus, of which the following is a specification.

My invention relates to apparatus for advertising or like purposes, and is particularly adapted for use on moving vehicles, such as automobiles.

By the use of my invention, a web or sheet of suitable material, preferably of a translucent character, and bearing a plurality of advertising units or series of units throughout its length, is automatically rolled and unrolled on rollers or cylinders suitably supported to rotate so as to expose each of such advertising units or series of units contained on such web or sheet in regular order and for a predetermined period of time. Such units are preferably so exposed at both sides and at the rear of a moving vehicle, such as an automobile, each unit or series of units appearing within a suitable frame. When the web has reached its limit of movement in one direction, the direction of rotation of the rollers or cylinders will be automatically reversed, preferably by electro-magnetic means, and the said units or series of units will again be exposed in the reverse order.

This invention consists in the features of construction, combinations and arrangements of parts hereinafter set forth, illustrated and described in the accompanying drawings and more particularly pointed out in the appended claims.

In the preferred form of my invention illustrated in the accompanying drawings, in which similar reference characters designate corresponding parts, Figure 1 is a side elevation of a covered automobile having my invention applied thereto; Fig. 2 is a front view of the same, the front portion of the shed and sides being broken away; Fig. 3 is a plan view of one set of the rollers; Figs. 4, 5, 6, 7, 8 and 9 are details of parts of the mechanism; and Fig. 10 is a diagrammatic view of the circuit for the solenoids shown in Figs. 2 and 5.

Referring now to these drawings, A designates a suitable support, which, as shown, comprises the shed of an automobile. The shed A is preferably divided up by moldings so as to form suitable frames A' for the display of the separate units of advertising contained on a web C of cloth or other suitable flexible and translucent material. In Fig. 1, a series of three units of advertising are shown exposed at one side of an automobile. Similar units may likewise be exposed at the back and at the other side thereof.

B designates rollers of wood or other suitable material, upon which the web C is wound and unwound. One or more pairs of such rollers are rotatably supported in any suitable manner within the shed A and the web C is wound on one member of a pair and connected to the other, so that it may be wound and unwound from one to the other and expose the units of advertising contained thereon within the frames formed in said shed. As shown, three pairs of rollers or cylinders B are suitably supported within the shed A, one member of each pair at the bottom of the wagon and the other member at or near the top of the shed and a web C connects the members of each pair, so that by rotating one of such members the web may be wound or unwound from one to the other thereof, according to the direction of rotation.

The top members of the three pairs, or what I may call the top series of rollers, are connected to each other so as to operate in unison, and the bottom members of the pairs or bottom series of rollers are likewise connected, thus forming with the connecting webs, a rectangular body consisting of three parallel pairs of rollers, all operating in unison. By connecting the pairs of rollers together in this manner a sufficient tension or "drag" is exerted to keep the webs taut.

The rollers, including their connections, are in all essential respects the same, and I have therefore considered it necessary to illustrate the bottom series only.

As shown, each of the rollers at the side of the shed are connected at one end to the roller at the back by means of intermeshing angle-cogs *b b* and the other end is mounted independently of the driving shaft and is intermittently coupled and uncoupled therewith by means of a coupling device hereinafter more specifically explained.

The power is derived from any suitable source, such as the motor E.

As illustrated, the shaft D is rotated through the medium of the worm F, worm wheel G, clutch box H and wheel I, which is fixed to the shaft D. The worm wheel G is loose on the shaft D and is connected by means of laterally-extending guide-pins g' to a double-acting clutch or clutch box H also loose on the shaft D and rotating with the worm wheel. Said clutch box is provided at each end with the usual projections and interdental spaces and is movable laterally on the guide-pins to engage counterpart boxes at either side thereof. In Figs. 2 and 5, the double-acting clutch-box H is shown as enmeshed at its left-hand end with a counterpart box on the wheel I which is, as aforesaid, fast on the shaft D, and such shaft will thus be rotated and with it the lower rollers to wind the web C thereon.

When the web is entirely wound on the lower rollers, the clutch box H is shifted out of engagement with the counterpart-box on the wheel I and into engagement with a counterpart box on a sprocket wheel L and the power is transmitted from the motor through the worm F, worm wheel G, clutch box H, sprocket wheel L, chain L', reversing gears N, O, chain l' and sprocket wheel l to the shaft D' and the upper rollers, to wind the web thereon. It will be understood, of course, that the sprocket-wheel L and its counterpart-box is also loose on the shaft D.

A lever h is preferably provided to throw the clutch-box H to either side as desired.

I preferably provide electro-magnetic means for shifting the clutch-box H so as to change the direction of rotation of the rollers when the web has been entirely wound upon either the top or bottom rollers, which means I will now describe.

One member of each series of rollers, that is, one upper and one lower is provided with a circuit making and breaking device, comprising a metallic plate Y embedded in and preferably flush with the periphery of the roller, at any suitable point over which the web winds. A metallic roller J rolls over and bears upon the web C as it is wound and unwound. When the web is entirely unwound, the roller J contacts with the metallic plate Y in the periphery of the roller and energizes a solenoid to swing or throw the clutch and reverse the direction of rotation of the rollers, whereupon, the web will be rewound upon such roller and will interpose itself between the plate and roller, thus acting to insulate the same and break the circuit.

I have shown, two solenoids 1 and 2 for shifting the lever h and through it the clutch-box H in opposite directions.

Electric current for energizing the solenoids 1 and 2 may be derived from any suitable source and in the present case, I have illustrated a battery 9. The circuit for the solenoid 2 is by way of wires 3 and 3ª, and thence by wire 4 to the circuit-making and breaking device, thence through wire 5, through the solenoid 2, wire 6 to 6ª and back to the battery. The circuit for the solenoid 1 from the battery is by way of wires 3 and 3ª, wire 7 to circuit controlling device, through wire 5ª, through solenoid 1, wire 8 to 6ª and thence to the battery.

In order to expose the separate advertising units contained on the web or other material for a predetermined period of time without stopping the driving mechanism, I provide, intermediate the power shafts and the rollers at one end of each of the longitudinally-disposed rollers, an escapement disk P which is fixed to the angle cog b and rotates independently of the roller proper. As shown, this escapement disk P is spaced from the roller and carries a starwheel p which, as shown, has four radial arms and is pivoted near the outer edge of the escapement disk on the face thereof contiguous to the roller. The star wheel p is rotated a quarter of a turn by engagement with a projection d' suitably supported in the path of the star wheel. One of the arms of the star wheel p is provided with an upwardly-projecting portion p' which when turned into position engages the roller B and the roller is carried around with the escapement disk for a single turn thereof. The projecting portion p' fits into a cutaway portion B' of the roller, when it is turned into position as aforesaid. A springpressed-dog d², is pivoted on the disk P contiguous to the star-wheel, engages each arm thereof as it is turned and prevents said wheel from making more than a quarter of a revolution upon each engagement with the projection d'. When the projection p' comes into contact with the cut-away portion B' of the roller, the dog d² holds it in engagement therewith until one of the other arms of the star wheel is engaged by the projection d', whereupon the roller again becomes stationary and the star wheel and disk rotate until the projection again comes into engagement with the roller. In this way, the advertising units or series of units contained on the web C are separately exposed for a predetermined period of time, depending upon the number of arms on the star-wheel and the speed of revolution of the operating mechanism.

It will be understood, of course, that, instead of the electro-magnetic means shown and described hereinabove for reversing the direction of rotation of the rollers, any suitable mechanical means for accomplishing this result may, if desired, be utilized.

Having described my invention, I claim:

1. The combination with a suitable display frame, of a web of material bearing a plurality of advertising units, a roller at each side of the frame for moving the web in opposite directions past the frame, driving mechanism for rotating the rollers,—the rollers being mounted independently of the driving mechanism,—a disk connected to the driving mechanism and continuously rotated thereby, a star-wheel pivoted on said disk, a projection suitably supported in the path of the star-wheel, and a projection on the star-wheel for engaging the roller as and for the purpose specified.

2. The combination with a suitable display frame, of a web of material bearing a plurality of separated advertising units, movement transmitting mechanism for said web comprising a power-shaft, a roller associated with each end of said web and mounted independently of said power-shaft, a disk mounted at right angles to the power-shaft, and continuously rotated thereby, a star-wheel pivoted on said disk eccentrically, a stationary projection in the path of the star wheel for actuating the same, and a projection on the star-wheel for engaging the roller, as and for the purpose specified.

In witness whereof, I have signed my name to the foregoing specification in the presence of two subscribing witnesses.

EDWARD FRANCIS NICHOLAS CANDIA.

Witnesses:
Jos. F. O'BRIEN,
R. V. FINN.